US008027856B2

(12) United States Patent
Krueger et al.

(10) Patent No.: US 8,027,856 B2
(45) Date of Patent: *Sep. 27, 2011

(54) AUTOMATED NOTIFICATION OF PART REVISIONS FOR OUTSIDE SUPPLIERS

(75) Inventors: Paul J. Krueger, Houston, TX (US); William R. Bratcher, Houston, TX (US); Wayne Thomas Wooton, Cypress, TX (US)

(73) Assignee: Vetco Gray Inc., Houston, TX (US)

( * ) Notice: Subject to any disclaimer, the term of this patent is extended or adjusted under 35 U.S.C. 154(b) by 734 days.

This patent is subject to a terminal disclaimer.

(21) Appl. No.: 10/996,200

(22) Filed: Nov. 23, 2004

(65) Prior Publication Data

US 2005/0091099 A1  Apr. 28, 2005

Related U.S. Application Data

(63) Continuation of application No. 09/602,138, filed on Jun. 23, 2000, now Pat. No. 6,868,387.

(51) Int. Cl.
G06F 9/44 (2006.01)
G06F 17/50 (2006.01)
(52) U.S. Cl. .......................... 705/7.11; 705/29
(58) Field of Classification Search ............ 705/7, 7.11
See application file for complete search history.

(56) References Cited

U.S. PATENT DOCUMENTS

| 5,361,199 | A | 11/1994 | Shoquist et al. |
| 6,212,549 | B1 | 4/2001 | Page et al. |
| 6,249,807 | B1 | 6/2001 | Shaw et al. |
| 6,366,933 | B1 | 4/2002 | Ball et al. |
| 6,418,448 | B1 | 7/2002 | Sarkar |
| 2001/0032166 | A1 | 10/2001 | Ruffo et al. |
| 2002/0069096 | A1 | 6/2002 | Lindoerfer et al. |

FOREIGN PATENT DOCUMENTS

JP     2000099587 A     4/2000

OTHER PUBLICATIONS

Helm, Clay, et al., "Documentum: Documentum DocLink 4.0 for SAP links supply-chain with the knowledge chain", M2 Presswire, May 4, 1999, M2 Communications Ltd.
Business Wire, "Motiva Software Corporation and Pentafour Software Solutions partner to deliver first web-based SAP R/3 Integration", Business Wire, Sep. 13, 1999, Business Wire.
Kemper, Lisa M., "PDM makes the connection", Computer-Aided Engineering, Apr. 2000, Penton Media, Inc.
Business Editors, Motiva Lauches eChange Solutions Release 3, Business Wire, New York, Jun. 21, 2000 [ProQuest].
Fulcher, ERP+PDM=productivity, Manufacturing Systems, Wheaton vol. 16, Issue 8, Aug. 1998, p. 36 [ProQuest].

(Continued)

*Primary Examiner* — Andre Boyce
(74) *Attorney, Agent, or Firm* — Bracewell & Giuliani LLP

(57) ABSTRACT

Revision of a part specification document, such as a drawing, a part specification, or a bill of materials, prompts execution of an automated notification process. A unique part number associated with the revised part specification document is employed in searching open purchasing documents for purchase orders or request for quotes containing the part number. Electronic mail addresses for outside supplier contacts are kept in the database and linked to the supplier master of the open purchasing documents containing the part number. An electronic mail notification of the part specification document revision is generated and transmitted to each electronic mail address identified as being associated with an open purchasing document containing the subject part number.

9 Claims, 3 Drawing Sheets

OTHER PUBLICATIONS

Fasca, PDM supplier keys on time—to market crunch, Electronic News, Jun. 8, 1998, p. 36 [ProQuest].

Karpinski, XML users search for single standard, Electronic Buyers' News, Issue 1150, Mar. 8, 1999, p. 52 [EBSCO].

PR Newswire, Ariba Integrates cXML With Microsoft BizTalk Framework, PR Newswire Association, Inc., Sep. 13, 1999, [Dialog: file 16].

Business Editors and High-Tech Writers, Motiva Lauches eChange Solutions Release 3; Collaborative Design Change management Solution Enables Companies to Drive Product Change Across Global Supply Chain, Business Wire, Jun. 21, 2000, New York, ProQuest.

Managing the Supply Chain, Ivey Business Journal, Mar. 1, 2000, pp. 1-8.

Wu, Xindong, Building Intelligent Learning Database Systems, AI Magazine, Fall 2000, pp. 61-67, American Association for Artificial Intelligence.

Shimasaki, Kent, E-Commerce to C-Commerce and Beyond, SpinCircuit Inc.—Electronic News, Mar. 19, 2001, San Jose.

Greenberg, Ilan, LINE Believes It Can Convince Suppliers to Use Its Software, The Wall Street Journal, Hong Kong.

House, W., et al., EDI Meets The Internet, Network Working Group, Jan. 1996, pp. 1-41.

Messmer, Ellen, Online Supply Chain Creating Buzz, Concerns; UCCnet Food Industry Exchange May Be Most Ambitious Example To Date Of E-Commerce Trend. (Industry Trend or Event), Network World, Inc., Apr. 24, 2000, Chicago.

Intel, Fujitsu Siemens and i2 Team For Electronic Supply Chain Management Solution, Telecomworldwire, Nov. 28, 2001, Ingram Investment Ltd.

Harreld, Heather, Steering Clear Of Design Snafus—With Virtual Collaboration, Users Gain Better Control Of Product Design And Delivery (Company Business And Marketing), InfoWorld Media Group, Inc., Jun. 18, 2001.

SPS Commerce And High Jump Software Partner, PR Newswire Association LLC, Oct. 9, 2001, St. Paul, Minnesota.

Auchincloss, Louis, MoD's Electronic Supply Chain Set to Transform Defence Procurement, The Engineer, Aug. 11, 2000, Centaur Publishing Ltd.

eConnections Debuts Extended Supply Chain Intelligence Suite, PR Newswire Association LLC, Nov. 5, 2001, Pasadena, California.

Business Editors and High Tech Writers, TheSupply.com Joins RosettaNet to Enable B2B Interoperability, Business Wire, Sep. 5, 2000, San Jose, California.

Democker, Judy, Businesses Seek To Cut Weak Links From Supply Chains Evolving Technology and Business Models Change How Companies Make, Sell, and Move Products, Information Week, Mar. 6, 2000.

AUTOMATED NOTIFICATION OF PART REVISIONS FOR OUTSIDE SUPPLIERS

CROSS REFERENCE TO RELATED APPLICATIONS

This application is a continuation of and claims priority to U.S. patent application Ser. No. 09/602,138, now U.S. Pat. No. 6,868,387, which is incorporated herein by reference in its entirety.

BACKGROUND OF THE INVENTION

1. Field of the Invention

The present invention relates generally to supply management systems and in particular to communications between an enterprise and outside suppliers for that enterprise. Still more particularly, the present invention relates to automatically notifying outside suppliers for an enterprise of design changes relating to the products supplied or services performed by the outside supplier.

2. Description of the Related Art

Improvements and other design changes are frequently required during the life cycle of tools and similar products. Engineers or designers within an enterprise may institute design changes to improve performance, reduce manufacturing costs, or increase compatibility with other products. However, such design changes complicate the supply management process since outside suppliers affected by the changes must be notified.

Currently, notification of outside suppliers regarding design changes is generally a manual and/or physical process. The engineer or designer must identify each outside supplier affected by the change. Modified drawings reflecting the design changes are sent, usually in hard copy form, to the outside suppliers which have been identified. Responses from the outside suppliers, which are also generally in hard copy form, must be correlated to the appropriate change or revision.

In contemporary supply systems, identifying outside suppliers affected by a design change (e.g., part specification and/or drawing changes) is complicated by the global nature of most manufacturing bases. A design change implemented by an engineer in Houston may affect a manufacturer in England or Singapore with whom the engineer has never had contact. Mere transmission of hard copies of the revisions to an outside supplier located on a different continent requires significant time and expense.

It would be desirable, therefore, to automate the process of notifying outside suppliers or other affected parties regarding relevant design changes.

SUMMARY OF THE INVENTION

Revisions of a part specification document, such as a drawing, a part specification, or a bill of materials, prompts execution of an automated notification process. A unique part number associated with the revised part specification document is employed in searching open purchasing documents for purchase orders or request for quotes containing the part number. Electronic mail addresses for outside supplier contacts are kept in the database and linked to the supplier master of the open purchasing documents containing the part number. An electronic mail notification of the part specification document revision is generated and transmitted to each electronic mail address identified as being associated with an open purchasing document containing the subject part number. The revision notification includes a link to the revised part specification document to enable the outside supplier to access the document and review the revisions. A response period during which the outside supplier is expected to access the revised document may be set, with an alert being generated if one or more outside suppliers receiving the revision notification fails to review the changes within the selected response period.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
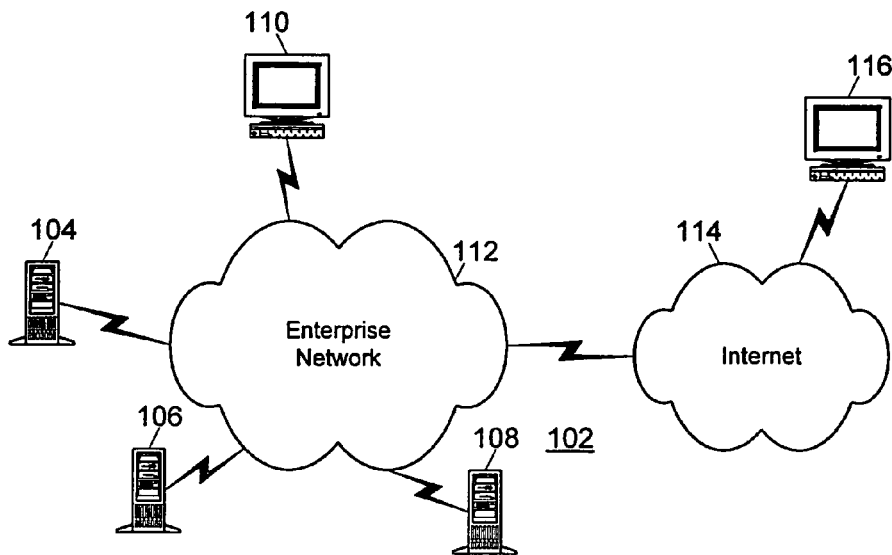
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes server systems 104, 106 and 108 and a workstation 110 coupled to an enterprise network 112. Enterprise network 112 is configured in accordance with the known art to allow workstation 110 to communicate with and control execution of applications within servers 104, 106 and 108, and to allow applications within servers 104, 106 and 108 to communicate with each other. Enterprise network 112 also includes a connection to the Internet 114 to allow communication with a system 116 maintained by an outside supplier. Data processing system network 102 also includes a system for automatically notifying outside suppliers of part revisions as described below.

Figure 2:
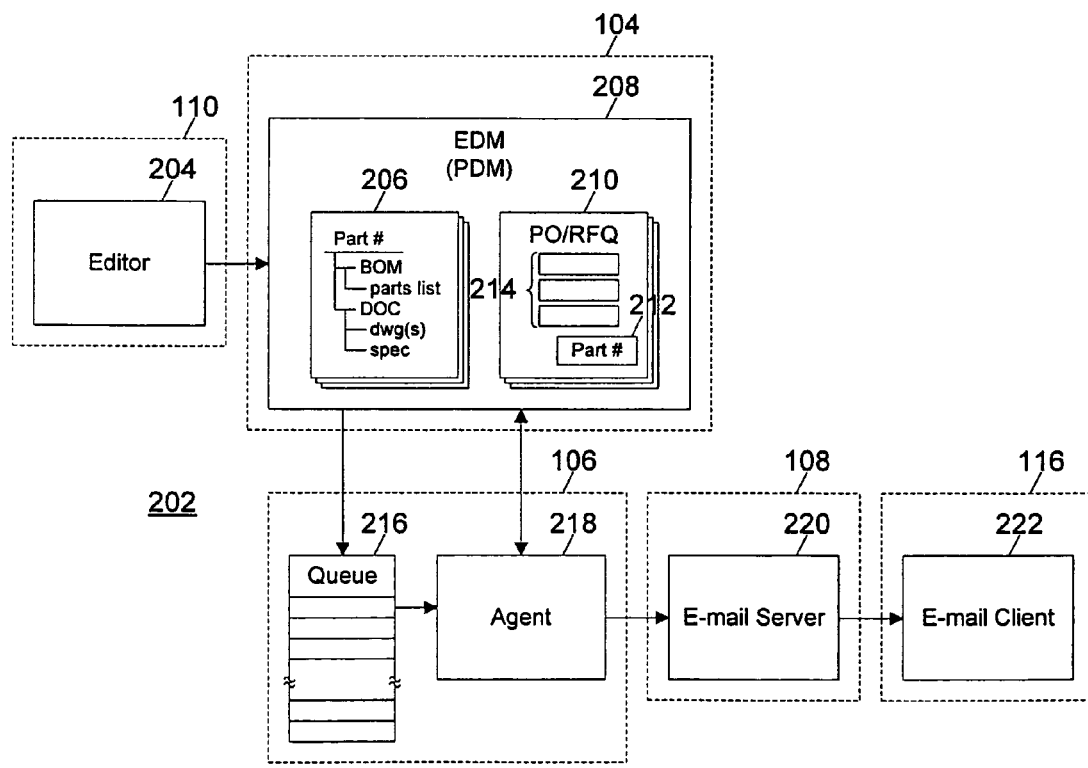
FIG. 2 is a block diagram of a system for automatically notifying outside suppliers of part revisions in accordance with a preferred embodiment of the present invention.

Referring to FIG. 2, a block diagram of a system for automatically notifying outside suppliers of part revisions in accordance with a preferred embodiment of the present invention is illustrated. System 202 or the exemplary embodiment includes an editor 204 executing within workstation 110. Editor 204 may be a simple text or compound document editor employed to edit text or HyperText Markup Language (HTML) documents, or a computer aided design (CAD) drafting or graphics program employed to edit drawings, which are preferably in the Tagged Image File Format (TIFF). Editor 204 is employed by a user to modify or revise part information 206 for a selected part.

Each product purchased by the enterprise from outside suppliers is assigned a unique part number, which is employed in linking documents relating to the product. Part information 206 includes various data regarding the product such as a bill of materials (BOM) containing a parts list for the product and documentation (DOC) such as drawings and specifications for the product. Part information 206 may be indexed or keyed by the relevant part number for the product.

Part information 206 is maintained and controlled by an enterprise document management (EDM) utility 208 executing within server 104 and tracking user access and revisions to registered documents, and revision histories for documents. Document management utilities providing control over electronic documents (text or HTML files, spreadsheets, drawings or graphics, etc.), including access control and keyword search identification, are known in the art. In the exemplary embodiment, the functionality normally associated with document management is extended to provide a part data management utility, which links documents by the part number and allows documents relating to the same part number— e.g., the bill of materials, specification(s) and drawing(s) for a particular product—to be logically organized and treated together, particularly for the purposes of revision histories.

Enterprise document management utility 208 also manages purchasing documents 210 relating to purchases from outside suppliers, such as purchase orders (Pos) and requests for quotes (RFQs). Purchasing documents 210 identify products which are the subject of the purchases by part number 212, and are associated with electronic mail addresses 214 for contact persons at the outside supplier receiving the purchase order or request for quote. The e-mail addresses may comprise a field within the purchase document or metadata associated with the purchase document. However, in the preferred embodiment, the enterprise document management utility 208 (depicted in FIG. 1) comprises a relational database, in which the outside supplier comprises a table or database including the e-mail addresses 214 for each supplier. Purchasing documents 210 include the outside suppliers' name(s), which are employed to look up e-mail addresses 214 in the master supplier table or database.

While the exemplary embodiment is described in the context of purchase orders and requests for quotes, the present invention may be applied to any type of supply document such as requisitions, frame agreements, or blanket orders. Moreover, the present invention may be utilized for customers as well as suppliers, and may also be utilized internally for production control. Accordingly, purchasing documents 210 may also include sales orders for customers, as well as work orders or shop orders for internal production flow management. In such cases, e-mail addresses 214 will be addresses for customers or particular enterprise employees within the production system rather than outside suppliers.

System 202 also includes a queue 216 for revisions and an agent 218 executing within server 106, together with an electronic mail (e-mail) server 220 executing within server 108 and transmitting e-mail messages to an e-mail client 222 executing within outside supplier's data processing system 116. Although depicted in the example shown as executing within separate servers 104, 106 and 108, enterprise document management utility 208, agent 218, and e-mail server 220 may all execute within a single data processing system.

In operation, system 202 notifies outside suppliers by electronic mail of revisions to part information 206. Upon detecting a revision to a document comprising part information 206, document management utility 208 queues a revision entry for processing within queue 216. The queue entry identifies the document revised and the part number to which the revised document relates. Agent 218 periodically checks queue 216 for revision entries requiring processing and, upon detecting a revision entry, searches purchase documents 210 for open or ongoing purchase orders and requests for quotes containing the part number within the revision entry from queue 216. These matching open purchase documents are then employed to identify the outside suppliers which should be notified of the revision.

In the preferred embodiment, only open purchasing documents are employed in the revision notification process, and outside suppliers are only allowed to access part information 206 which is associated with an open purchase document. Once a purchase order or request for quote is closed, access to the related part information by outside suppliers is terminated to maintain the security and confidentiality of proprietary enterprise information. An access control system (not shown) prevents access by any outside supplier to part information relating only to closed purchasing documents, but may permit selective access to part information based on the identification of an outside supplier within related purchasing documents.

Any open purchase documents 210 including the part number associated with the revised part information document 206 are identified and the e-mail addresses within or associated with such matching purchase documents 210 are extracted. Because the same supplier may be identified in connection with more than one purchasing document, the list of e-mail addresses may be limited to unique or discrete addresses and not allowed to include duplicate addresses. Agent 218 then generates an e-mail message regarding the revision, including a uniform resource locator (URL) link to the revised document which allows the outside supplier receiving the e-mail message to access and review the revised document—under appropriate security constraints such a logging in with a password—over the Internet.

Agent 218 transmits notifications to outside suppliers whenever a part revision is created, modified, deleted, or released within part information documents 206. Thus, when a part revision is first initiated and saved by an engineer or designer, outside suppliers are notified to allow the supplier as much lead time as possible in preparing to retool production. Similarly, when a part revision is altered, the outside supplier is notified. When the part revision is canceled or "released" (formally incorporated into the design specification), the outside suppliers are notified to allow production to be changed accordingly.

Agent 218 also sets a response period for each outside supplier notified. In the exemplary embodiment, the response period is two days. If an outside suppliers does not respond to the revision notification, either through a responsive e-mail or by accessing the revised part information document, agent 218 notifies an appropriate enterprise manager by e-mail, enabling the enterprise to determine why the outside supplier has not responded to the revision notification. For this reason, the outside suppliers' e-mail addresses for receiving revision notifications may be employed as a user identifier in logging on to review the revised part information document.

Figure 3:
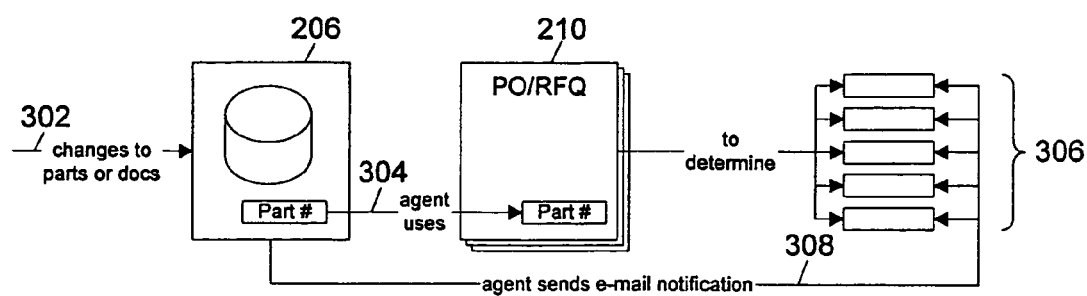
FIG. 3 depicts a data flow diagram for a process of automatically notifying outside suppliers of part revisions in accordance with a preferred embodiment of the present invention.

With reference now to FIG. 3, a data flow diagram for a process of automatically notifying outside suppliers of part revisions in accordance with a preferred embodiment of the present invention is depicted. A revision or change 302 to a part specification document 206, such as a drawing or bill of materials, initiates the notification process. The notification agent utilizes the part number 212 to search purchasing documents 210 such as purchase orders and requests for quotes.

The notification agent utilizes the purchasing documents 210 containing the matching part number for the revised specification document to determine the e-mail addresses 306 of the outside suppliers which should be notified of the part revision. The agent then generates an e-mail notification of the part revision, including a link to the part specification document which was changed, and transmits the notification 308 to each of the identified outside supplier e-mail addresses 306. The notification agent may then optionally monitor response to the revision notification and alert a supply manager to any nonresponsive outside suppliers.

Figure 4:
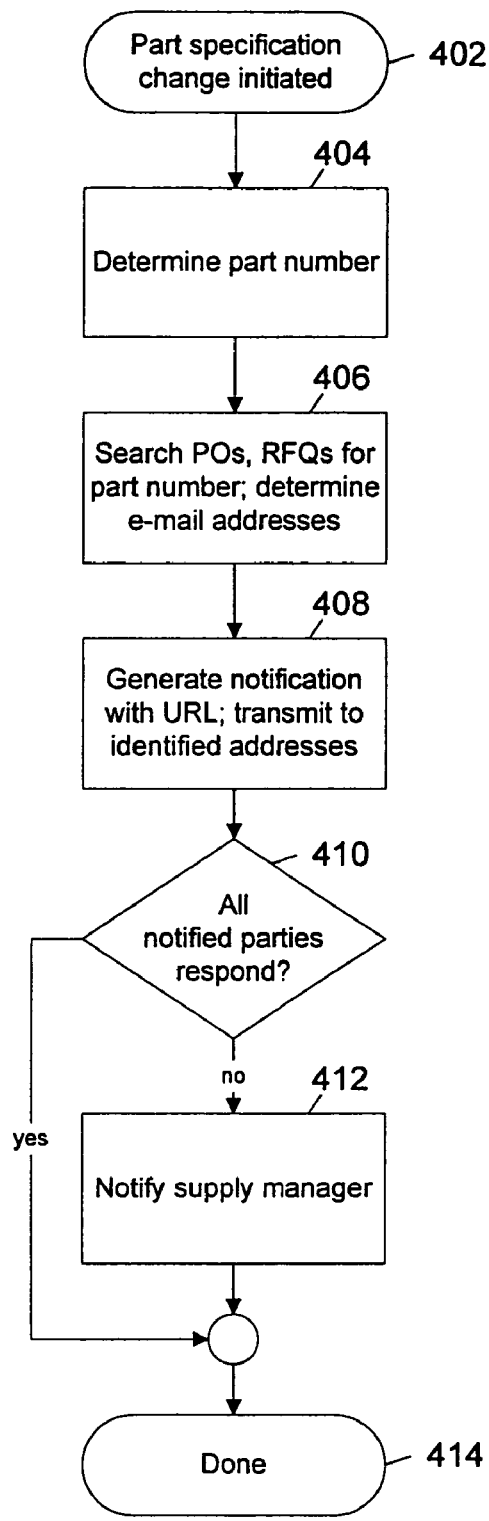
FIG. 4 is a high level flow chart for a process of automatically notifying outside suppliers of part revisions in accordance with a preferred embodiment of the present invention.

Referring to FIG. 4, a high level flow chart for a process of automatically notifying outside suppliers of part revisions in accordance with a preferred embodiment of the present invention is illustrated. The process begins at step 402, which depicts a part specification change being initiated (or altered, deleted, or released). The process first passes to step 404, which illustrates determining the part number associated with the part specification document (drawing, bill of materials, etc.) which is affected. The process next passes to step 406, which depicts search purchasing documents for the part number, and determining the e-mail addresses of outside suppliers having an association with the purchasing document (for example, as the recipient or originator of the purchase order or request for quote).

The process then passes to step 408, which illustrates generating an e-mail notification containing the URL for the revised part specification document, and transmitting the notification to each of the e-mail addresses identified as being associated with purchasing documents containing part number from the revised part specification document. The process passes next to step 410, which depicts a determination of whether all notified parties have responded to the notification within the preselected response period, either by return e-mail or, preferably, by accessing the part specification document which was changed. If not, the process proceeds to step 412, which illustrates alerting an enterprise employee (such as a supply manager or clerk or the engineer/designer initiating the part revision) to the nonresponsiveness of one or more notified parties. Otherwise, the process proceeds instead directly to step 414, which depicts the process becoming idle until another part revision is initiated.

The present invention provides automatic notifications to outside suppliers of part revisions which affect the respective suppliers. A list of impacted vendors which should be notified of a part change need not be manually determined, but is instead automatically ascertained from purchasing documents, correlated by the part number of the part which was changed. The revisions are immediately accessible to the outside suppliers by accessing the revised part specification documents, rather than awaiting courier delivery.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A machine for updating part specification and purchasing documents, the machine comprising:

a manufacturer computer for notifying relevant parties of revisions to part specification documents and purchasing documents, the manufacturer computer comprising a processor and computer readable and non-transitory storage media including computer readable instructions stored thereon that when executed causes control circuitry within the manufacturer computer to perform the steps of:

monitoring user access to the part specification documents to determine whether a part specification in the part specification documents has been revised, revisions to the part specification document including adding, deleting or revising part specifications, the part specification documents including drawings of parts;

responsive to detecting a revision to a part specification document for a part, identifying a unique part number associated with the part having the revised part specification;

searching open purchasing documents relating to purchases from outside suppliers for the unique part number responsive to the identifying of the unique part number to thereby identify each of one or more open purchasing documents associated with the part having the revised part specification, the identified one or more open purchasing documents comprising one or more open purchase orders for the part, the part currently being manufactured under the one or more open purchase orders;

identifying, responsive to searching the purchasing documents, each supplier electronic mail address associated with each corresponding open purchasing document containing the unique part number for the part having the revised part specification document, each supplier electronic mail address associated with a different outside supplier;

responsive to identifying each respective supplier electronic email address associated with each open purchasing document containing the unique part number for the part having the revised part specification, generating to each of the respective outside suppliers, a separate electronic mail message notification of the revision to the part specification document for the part having the unique part number contained within the respective purchasing document, each electronic mail message notification containing the unique part number and a link to the revised part specification document;

monitoring access by each of the outside suppliers receiving the electronic mail message notification of the revised part specification document to thereby determine whether each notified outside supplier affected by the revision has accessed the revised part specification document within a preselected period of time; and determining, by sending a second electronic notification, why one or more of the notified outside suppliers has not accessed the revised part specification document.

2. A computer program product for performing a process of making revisions to part specification and purchasing documents and a process of notifying relevant parties associated with purchasing documents of the revisions, the computer program product comprising a set of instructions, stored on a tangible non-transitory computer readable medium, that when executed by a computer, cause the computer to perform the following operations:

monitoring user access to the part specification documents, the user access being for creation, deletion, or release of a part specification document defining a revision, the revision being associated with a part having a unique part number;

searching open purchasing documents relating to outside suppliers for the unique part number responsive to the creation, deletion, or release of the revision to thereby identify each open purchasing document associated with the part associated with the revised part specification document, the identified open purchasing documents comprising one or more open purchase orders for the part, the part being currently manufactured under the one or more open purchase orders;

automatically identifying an email address associated with each respective outside supplier associated with each purchasing document containing the unique part number of the part associated with the revised part specification document;

automatically notifying each identified outside supplier of the revision; and providing the revised part specification document to each identified outside supplier associated with each respective purchasing document containing the unique part number of the part associated with the revised part specification document.

3. A computer program product as defined in claim 2, wherein the step of automatically notifying the identified outside supplier of the revision includes the step of generating, responsive to identifying each electronic email address associated with each outside supplier, an electronic mail message notification of the revision to the part specification document, the electronic mail message notification containing the unique part number and a link to the revised part specification document; and wherein the steps further comprise:
monitoring access by each identified outside supplier receiving the electronic mail message notification to thereby determine whether the revised part specification document has been accessed within a pre-selected period of time, and
determining, by sending a second electronic notification, a reason why one or more notified outside suppliers has not accessed the revised part specification document.

4. A computer program product as defined in claim 2, wherein a plurality of outside suppliers are each affected by the revision; and wherein the step of automatically notifying the identified outside supplier of the revision includes the step of generating an electronic mail message notification to each of the plurality of outside suppliers affected by the revision.

5. A computer program product as defined in claim 2, wherein a plurality of purchasing documents are each associated with the unique part number; and wherein the step of automatically notifying the identified outside supplier of the revision includes the step of generating an electronic mail message notification to each supplier associated with each separate one of the plurality of purchasing documents.

6. A computer implemented method of notifying relevant parties of revisions to part specification documents, implemented by a manufacturer computer associated with a manufacturer and for performing a process of updating manufacturer part databases and a process of notifying outside part suppliers of updated purchasing requirements, the computer implemented method comprising the following steps:

responsive to detecting a revision to a part specification document for a part, identifying a unique part number associated with the part having the revised part specification document;

positioning each unique part number associated with the revised part specification revisions within a queue defining a part revision notification queue;

checking the part revision notification queue for presence of a unique part number indicating a revision to an associated part specification document has been made;

responsive to the presence of unique part number in the part revision notification queue, searching all open purchasing documents and all part specification documents stored within computer memory for documents containing the unique part number, the open purchasing documents comprising one or more open purchase orders for the part, the part being currently manufactured under the one or more open purchase orders;

responsive to locating an open purchasing document containing the unique part number, identifying an outside supplier electronic mail address associated with the identified open purchasing document; and generating, responsive to identifying each outside supplier electronic email address, an electronic mail message notification of the revision to the part specification document for the part having the unique part number associated with the purchasing document, the electronic mail message notification being generated for transmission to the outside supplier electronic mail address associated with the purchasing document, the electronic mail message notification containing the unique part number and a link to the revised part specification document.

7. The computer-implemented method of claim 6, wherein the step of searching all open purchasing documents for the unique part number comprises searching open purchase orders and open requests for quotes for the unique part number; and wherein the method further comprises terminating outside supplier access to the manufacturer computer responsive to closing at least one of the following: an open purchase order and an open request for quotes, having the unique part number associated therewith.

8. The computer-implemented method of claim 6, wherein the step of generating an electronic mail message notification of the revision to the revised part specification document for the part having the unique part number associated with the purchasing document, comprises:

generating by a message containing a uniform resource locator link to the revised part specification document.

9. The computer-implemented method of claim 6, further comprising:

setting a response period for the outside supplier to access the revised part specification document;

monitoring access to the revised part specification document during the response period; and responsive to determining that at least one recipient of the electronic mail message notification failed to access the revised part specification document during the response period, transmitting an alert to a designated electronic mail address to thereby assist in determining why the failed access to the revised part specification document has occurred.

\* \* \* \* \*